March 26, 1929.  W. H. POWELL  1,706,818
DYNAMO ELECTRIC MACHINE AND WINDING THEREFOR
Filed Feb. 18, 1926  2 Sheets-Sheet 1

Inventor
W. H. Powell
by
Attorney

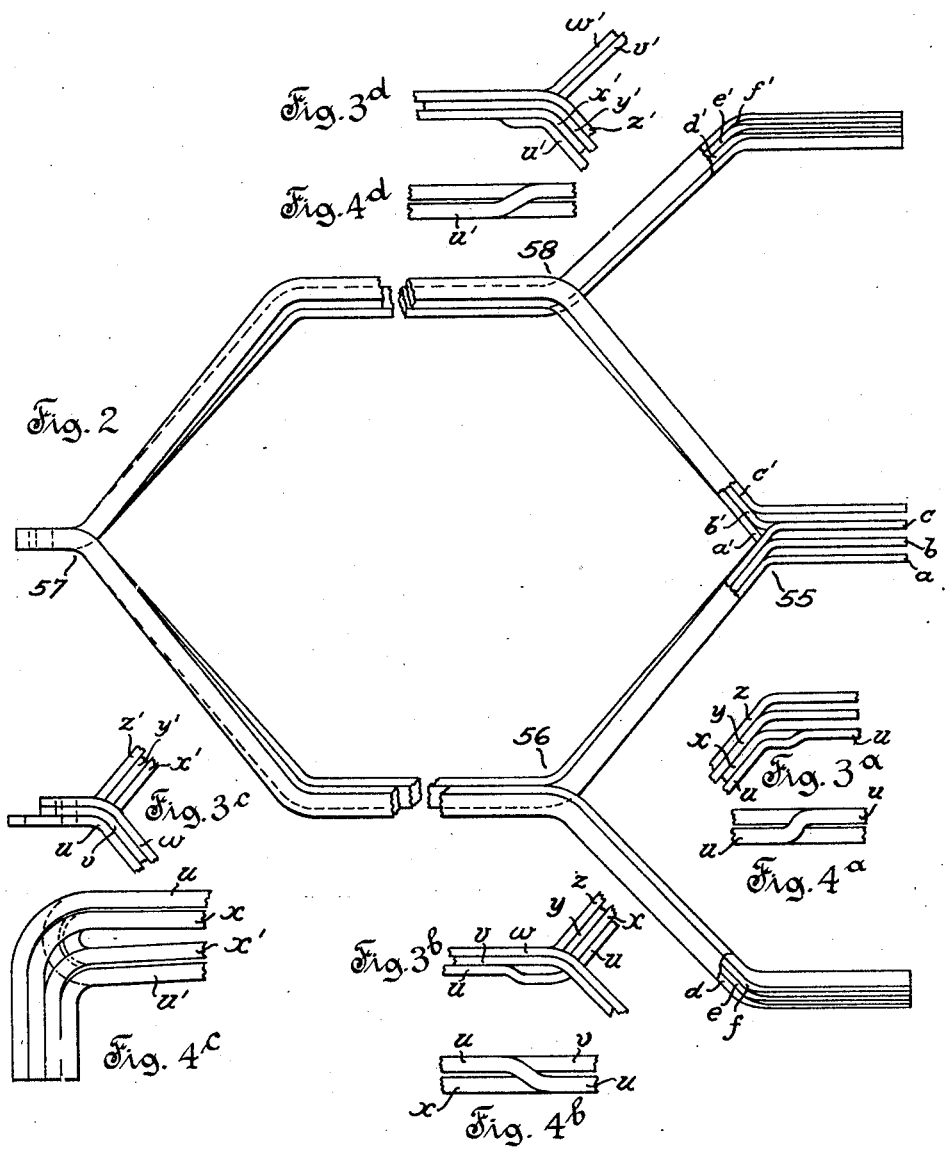

Patented Mar. 26, 1929.

1,706,818

UNITED STATES PATENT OFFICE.

WILLIAM H. POWELL, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Application filed February 18, 1926. Serial No. 89,017.

This invention relates to dynamo-electric machines and windings therefor.

One of the objects is to provide a wave type winding in which all of the coils are not wave wound. Another object is to provide a winding comprising such a wave type winding in combination with a lap winding.

Another object is the provision of a winding in which the currents in the various armature paths will be equalized without the use of cross-connectors. Still another object is the provision of a winding in which the potential rise from one brush to another measured from bar to bar on the commutator will form a substantially smooth curve.

Still another object is the provision of an armature for machines in which taps or phase connections are necessary such as in machines of the three-wire type, or rotary converters and in which no external cross-connectors are necessary. A further object is to provide an armature with combined lap and wave type windings which may be used for rotary converters or other machines involving taps or phase connections. A still further object is to provide a winding for machines of the hereinbefore mentioned character in which heating of the winding at the taps or phase connection points is avoided.

A still further object is to provide windings of the hereinbefore mentioned character in which the number of circuits or paths in one component of the winding is equal to the number in the other component.

Other objects will appear hereinafter as the description of the invention proceeds.

The novel features of the invention will appear from this specification and the drawings accompanying the same and forming a part thereof, and showing one embodiment of the invention, and all these novel features are intended to be pointed out in the claims.

In the drawings:

Fig. 2 is a plan view of a winding element which may be used in a machine such as shown in Fig. 1.

Figure 1:
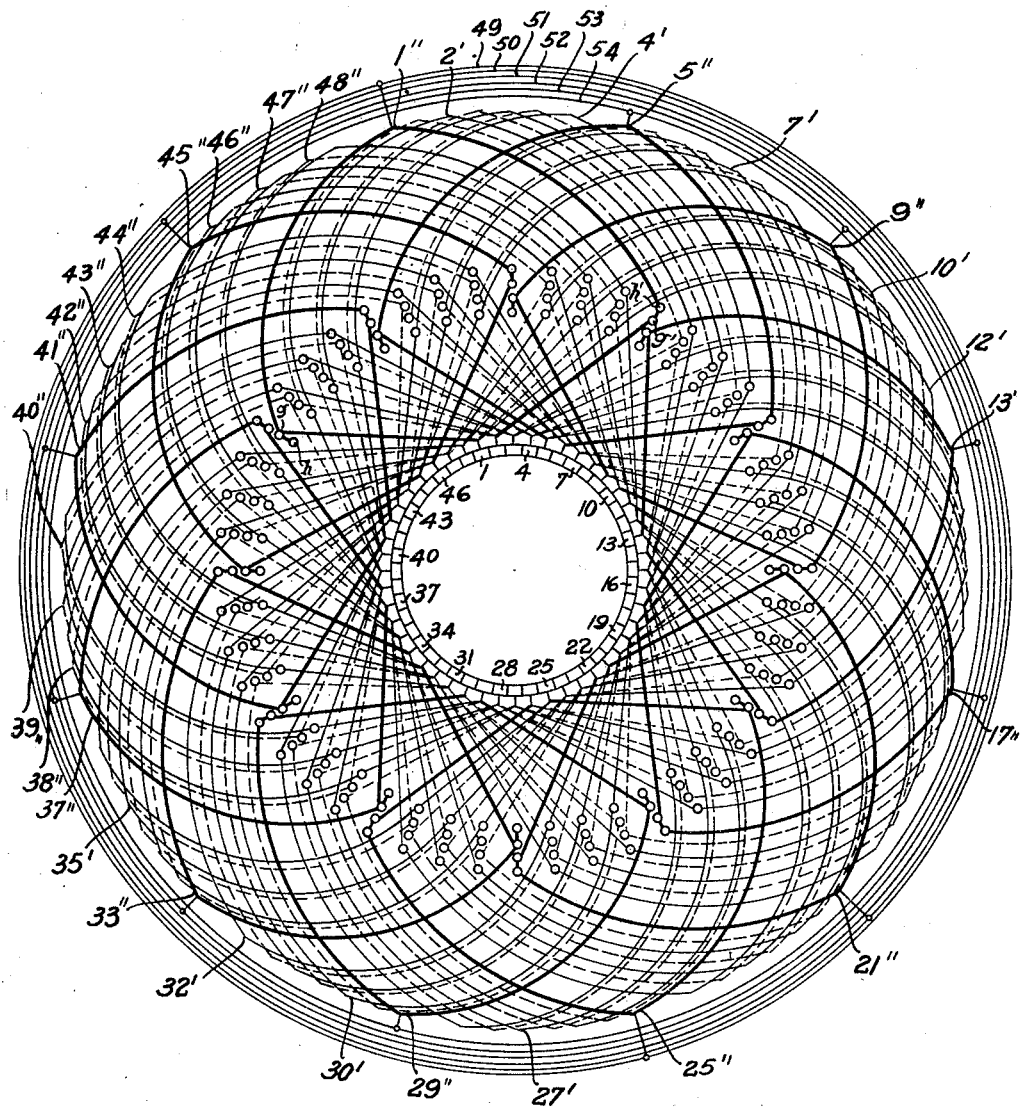
Fig. 1 is a diagram of connections for a rotary converter armature.

Figs. $3^a$, $3^b$, $3^c$ and $3^d$ are fragmentary plan views of portions of another form of winding element which may also be utilized in a machine such as shown in Fig. 1.

Figs. $4^a$, $4^b$, $4^c$ and $4^d$ are fragmentary side elevations of Figs. $3^a$ to $3^d$ inclusively, respectively.

In Fig. 1 the invention has been shown as it may be applied in a rotary converter armature. For the sake of simplicity a comparatively small number of commutator bars has been chosen, namely, 48. For the same reason the number of slots is also shown as 48. The machine is shown as provided with six slip rings 49, 50, 51, 52, 53 and 54, the particular machine illustrated being a 6-phase, 4-pole machine.

The armature is here shown as provided with a combined lap and wave type winding. The lap winding is indicated by the dotted lines. The wave type winding has its wave wound conductors indicated by the light full lines. As will appear hereinafter all of the conductors belonging to the wave type winding do not constitute wave wound coils. The armature here shown has a total of 192 conductors there being 4 conductors per slot, as indicated by the circles arranged in radial rows. 96 of the conductors are connected to form a lap winding which in the illustrated example is of the simplex type inasmuch as if we start tracing the lap winding from any given commutator bar we will pass through all of the 96 conductors allotted to the lap winding before we reach the bar at which we started. It will be noted, in tracing the lap winding that we include in this winding the coils 1″, 5″, 9″, 13″, 17″, 21″, 25″, 29″, 33″, 37″, 41″ and 45″ which are here drawn in heavy full lines for the purpose of distinguishing them from the other conductors. These hereinbefore mentioned coils are common to both the lap winding and the wave type winding, as will appear hereinafter.

The nature of the wave type winding will be best understood by tracing at least a part of it, beginning for example, at commutator bar 1. For this purpose reference may be had to the following table:

```
Coils (lap) ........    48"-47"-46"-45"-44"-43"-42"-41"-40"-39"-38"-37"
Bars  (lap) ........    1-48-47—46
                              45—44-43————42
Bars (W. T. W.) ....    1-24-47—22                    41————40—39——38
                              21—44-19————42                    37
                                                      41————16—39——14
                                                                13
Coils (W. T. W.) ...    12'-35'-10'-21"-32'-7"—30'—41"-4'—27'-2'—13"
```

Referring to the line in the table marked "Bars (W. T. W.)" this enables tracing of the wave type winding from bar to bar beginning at bar 1, the numbers indicating the commutator bar numbers. When we reach bar 22, instead of continuing to trace the winding in a clockwise direction, we pass in a counter clockwise direction through coil 21" to bar 21. From bar 21 we again trace in a clockwise direction through wave wound coils to bar 42 and from there counter clockwise through coil 41" to bar 41 and from there again clockwise through several wave-wound coils, as indicated in the table above, to bar 14 from which we pass counter clockwise through coil 13" to bar 13 and so on. As was previously stated, the table is not a complete one for the winding inasmuch as the complete table is too long and is not necessary for a complete understanding of the invention. It will also be noted from the table and from an actual tracing of the lap winding that coil 21" is symmetrically placed with respect to coil 45" the latter being connected to bars 45 and 46. Coils 21" and 45" are here shown as provided with phase connections leading to slip ring 50. If the wave type winding is completely traced it will be found that the coil 45" will be eventually reached and traced through in a manner similar to that already described in connection with the partial wining table. Referring again to the table, the connection of the lap winding from bar to bar is shown at the line marked "Bars (lap)". It will be noted that those bars in the lap and wave type windings that have connected thereto coils to which phase connections may be applied are offset so as to make them readily distinguishable. The lap coils are indicated in the first line of the table marked "Coils (lap)" by a double primed number corresponding to the reference numerals in Fig. 1. The lap coils have been numbered arbitrarily as having the same number (but double primed) as one of the commutator bars to which they are connected as for example from bar 1 we pass to lap coil 48" to bar 48, to coil 47" to bar 47, etc. The coils of the wave type winding traced through in using the table for "Bars (W. T. W.)" are indicated at the line marked "Coils (W. T. W.)", that is, from bar 1 we pass through wave wound coil 12', from there to bar 24, from there to wave wound coil 35' and so on. It will be noted that the wave wound coils have been indicated by primed numerals, whereas the lap wound coils are double primed. It will now be clear that the lap wound coils indicated by the heavy full lines in Fig. 1 are common to both the lap winding and the wave type winding, and that, in the winding shown, coils 360 electrical degrees apart are connected to the same slip rings.

The wave type winding has been hereinabove arbitrarily traced generally in a clockwise direction. The winding could of course have been traced in a counter-clockwise direction. The direction of tracing does not, however, change the character of the winding. The wave coils in the illustrated embodiment of the invention have a commutator pitch which is less than the equipotential pitch and the winding is therefore termed a retrogressive or left hand winding. If the commutator pitch were greater than the equipotential pitch the winding would be called a progressive or right hand winding. The lap coils, in the illustrated embodiment, having a back pitch greater than the front pitch, are of the progressive or right hand type. In general, if the wave winding progresses in one direction the lap winding should progress in the opposite direction.

In tracing the wave type winding through completely from any given bar such as bar 1, it will be found that we pass through 96 conductors, that is, all of the conductors belonging to the wave type winding before we again reach bar 1. The winding is therefore of the simplex type but it is doubly reentrant and therefore it has four circuits which is equal to the number of circuits in the 4-pole lap winding. There should be such a predetermined number of wave type windings, whether one or more, and the individual reentrancies of the wave winding should be such that the number of circuits in the wave type winding collectively is equal to the total number of circuits in the lap winding.

In considering the points on the winding where tap or phase connections are made, a consideration of one of these places will be sufficient for all. Referring to coil 1″, Fig. 1, it will be noted that the active conductors of this coil are $g$, $h$, and $g'$, $h'$. The conductors $g$, $g'$ occupy positions corresponding to other conductors in the dotted line lap winding whereas the conductors $h$, $h'$ occupy positions corresponding to the other conductors in the wave type winding. From commutator bars 1 and 2 there are but two end connections leading from these bars to the conductors $g$, $g'$ but as these end connectors carry double the current carried by the dotted line end connectors they should be made heavier. In other words, they carry both the current through conductors $g$ and $h$, these latter conductors, as also $g'$ and $h'$, being respectively connected to each other. It is clear that, for example, conductors $g$ and $h$ could be combined into one single copper bar. It will be noted that considering for example, the front end connections for the lap and wave type windings that they are arranged in four concentric layers, the radially outermost and radially innermost layers being occupied by end connectors belonging to the wave type winding whereas the two intermediate layers are occupied by end connectors of the lap winding. This is of course true where the end connectors reach the radially extending commutator necks to which they are connected. It is therefore desirable that an end connector leading from the combined conductor $g$—$h$ should pass into the layer of end connections presented by the conductor $g$.

It will be noted that if the armature winding were of the unmodified form of combined lap and wave winding such as illustrated in applicant's copending application S. N. 713,723 filed July 24, 1923, (now Patent No. 1,628,611 issued May 10, 1927) coil 1, for example, would be made up of two coils one of which has its conductor so wound as to form a lap coil and the other a wave coil. If the phase connection were made only to the lap coil or only to the wave coil either of these coils would heat abnormally. On the other hand it would not be possible to make the phase connection to both of these coils for the reason that such lap and wave coils have their coil sides connected to points of opposite potential on the commutator. It will be obvious therefore that the winding here disclosed obviates these difficulties while retaining all of the advantages set forth in applicant's copending application.

It is not necessary to form the conductors $g$, $h$ as a single conductor or to utilize but one end connection, as will appear hereinafter.

Referring now to Fig. 2, this shows a plan view of a combined lap and wave coil for a machine in which there are normally three lap coils per slot and three wave coils per slot, that is, there are a total of 12 coil sides per slot, 6 of which are lap coil sides and 6 of which are normally wave coil sides. If, as shown in Fig. 2, the lap and wave coils have the same pitch, they may be taped up together to form a single form-wound element. The upper terminals connectible to the commutator necks, of the 3 lap coils here shown, are designated $a$, $b$, $c$ and the lower ones $a'$, $b'$, $c'$. In like manner the wave coils are designated $d$, $e$, $f$ and $d'$, $e'$, $f'$. It will be understood that the end connections $d$, $e$, $f$ and $d'$, $e'$, $f'$ will be in the radially outermost and radially innermost concentric layers respectively, whereas the end connections $a$, $b$, $c$ and $a'$, $b'$, $c'$ will be in the intermediate layers respectively. The coils as shown in Fig. 2 might be termed normal coils whereas the coils provided at the phase connection points are of different form. These latter coils are wound as shown in Fig. $3^a$ to Fig. $3^d$ inclusive. Fig. $3^a$ is a plan view of that portion of a phase connection coil corresponding to the part 55 of the normal coil. Fig. $3^b$, Fig. $3^c$ and Fig. $3^d$ are plan views of the portions of a phase connection coil corresponding respectively to the portions 56, 57 and 58 of the normal coil. Considering Fig. $3^b$ first, there are 3 conductors $u$, $v$, $w$ in the radially outermost layer and 3 conductors $x$, $y$, $z$ in the next to the radially outermost layer. The conductors $v$, $w$ are wound so that their end connectors turn, as viewed in Fig. $3^b$, in a downward direction. The conductor $u$ on the other hand is bent radially inward as shown in Fig. $4^b$ and then passes along with the lap type end connections $x$, $y$, $z$. Following this conductor $u$, to Fig. $3^a$, it there is bent so as to pass out of the layer of lap type end-connections $x$, $y$, $z$ radially outward (as shown in the side view Fig. $4^a$) into the radially outermost layer of commutator terminal connections, which latter corresponds to the normal position of the terminal connections for the normal wave wound coils as represented by Fig. 2. Tracing the conductor $u$ toward the back end connection we find that, as in Fig. $3^c$, it extends slightly beyond the U-bend of the normal coil and in the construction here shown appears in side elevation as shown in Fig. $4^c$, the conductor being bent at some desired angle to form a terminal connectible to a predetermined slip ring. The back end connection of the other side of the coil $u$ begins as a terminal for the same slip ring and proceeds as a conductor $u'$ toward the commutator and at that portion of the coil corresponding to the portion 58 of the normal coil it is bent radially outwards into the next radially adjacent layer occupied by the lap coil end connections $x'$, $y'$, $z'$ which correspond to the conductors $x$, $y$, $z$. In like manner, the lap coil $x$—$x'$ is formed to provide back end connections connectible to a slip ring as shown in Fig. $4^c$.

It will therefore be seen that the conductors $u, u'$ which in the normal coil would be formed to constitute wave wound coils are, in the special coil, formed to constitute lap wound coils. The coil $u, u'$ while it is a part of the continuous wave type winding, as has been hereinbefore shown in connection with Fig. 1, is electrically also a part of the lap winding particularly as to current flowing to and from the phase connection. This is also true as to the coil $x-x'$. Either one of these coils or both of them together may therefore be regarded as coils common to either the lap or wave type winding.

It will be clear that it is not essential that the wave and lap wound coils occupy the particular concentric layers as illustrated but that, for example, the lap wound coils might occupy the radially outermost and innermost layers.

It should be understood that it is not desired to limit the invention to the exact details of construction and operation shown and described, for obvious modifications will occur to persons skilled in the art.

It is claimed and desired to secure by Letters Patent:

1. An armature provided with a predetermined number of slip rings, a winding for said armature, a predetermined number of equalizing connections for said winding including active winding elements, and a connection from one of said rings to a portion of said winding and to one of said equalizing connections.

2. An armature having its conductors connected to form respectively a lap type winding and a wave type winding connected in parallel, a predetermined number of said conductors less than the total number being common to both the lap and wave type windings, a given wave type circuit of said armature containing a predetermined number of lap coils alternating with groups of series connected wave coils each of said groups containing more than one coil.

3. An armature provided with a commutator and a predetermined number of slip rings having its conductors connected to form respectively a lap type and wave type winding, a predetermined number of said conductors being common to both the lap and wave type windings and a connection from one of said rings to one of said common conductors.

4. A commutator type armature winding having its conductors connected to form a wave type winding, a predetermined number of said conductors less than the total number having their terminals connected to said commutator to form lap coils, a given wave type circuit of said armature containing a predetermined number of lap coils alternating with groups of series connected wave coils each of said groups containing more than one coil.

5. A commutator type armature having its conductors connected to form a wave type winding, a predetermined number of said conductors having their terminals connected to said commutator to form lap coils in series with the wave connected conductors, said lap connected and wave connected conductors having slot pitches and terminals having armature pitches such that the lap connected coils progress in a direction opposite from that of the wave connected coils.

6. A commutator type armature having its conductors connected to form respectively a lap winding and a wave type winding, a predetermined number of the conductors less than the total number of said wave type winding having their terminals connected to said commutator to form lap coils, a given wave type circuit of said armature containing a predetermined number of lap coils alternating with groups of series connected wave coils each of said groups containing more than one coil.

7. A commutator type armature having its conductors connected to form respectively a lap winding with the conductors having slot pitches and terminal connections to the commutator such that the winding progresses in a given direction and a wave type winding with wave connected conductor terminals having a commutator pitch such that the winding progresses generally in the opposite direction, a predetermined number of conductors of said wave type winding having their terminals connected to said commutator to form lap coils progressing in the same direction as said lap winding.

8. A commutator type armature having its conductors connected to form respectively a lap winding and a predetermined number of wave type windings, the number of wave type windings being such and individual reentrances such that the total number of circuits in said predetermined number of said wave type windings is equal to the total number of circuits in the lap winding, a predetermined number of conductors of said predetermined number of wave type windings having their terminals connected to said commutator to form lap coils.

9. A rotary converter type armature having its conductors connected to form respectively a lap winding and a predetermined number of wave type windings, the number of wave type windings being such and the individual reentrances such that the total number of circuits in said predetermined number of wave type windings is equal to the total number of circuits in said lap winding, a predetermined number of conductors of said predetermined number of wave type windings having their terminals connected to the commutator to form lap coils located at the phase connection points.

10. In an armature having induced conductors, front end connections and commutator connection terminals disposed in concentric layers, a predetermined number of said induced conductors having their end connections disposed in layers other than those in which said predetermined number of induced conductors are disposed and having their commutator connections disposed in layers corresponding to those in which said predetermined number of induced conductors are disposed.

11. In an armature including the lap winding and wave type winding having the coils thereof disposed in concentric layers, a predetermined number of coils in said wave type winding having lap type end connections disposed in the layers in which the end connections of said lap winding are located.

12. In an armature including the lap winding and wave type winding having the coils thereof disposed in concentric layers, a predetermined number of coils in said wave type winding having lap type end connections disposed in the layers in which the end connections of said lap winding are located, and having the commutator terminals of said end connections disposed in the layers in which the end connections of said wave type winding are located.

In testimony whereof, the signature of the inventor is affixed hereto.

WILLIAM H. POWELL.